(12) United States Patent
Hara et al.

(10) Patent No.: US 12,140,755 B2
(45) Date of Patent: *Nov. 12, 2024

(54) PROJECTION DEVICE AND HEAD-UP DISPLAY

(71) Applicant: PANASONIC AUTOMOTIVE SYSTEMS CO., LTD., Kanagawa (JP)

(72) Inventors: Hiroki Hara, Osaka (JP); Yosuke Asai, Osaka (JP); Keiji Sugiyama, Kyoto (JP); Yuji Takase, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,188

(22) Filed: Aug. 15, 2023

(65) Prior Publication Data

US 2023/0384589 A1 Nov. 30, 2023

Related U.S. Application Data

(63) Continuation of application No. 17/613,261, filed as application No. PCT/JP2020/018764 on May 11, 2020, now Pat. No. 11,768,371.

(30) Foreign Application Priority Data

May 30, 2019 (JP) .................................. 2019-101313

(51) Int. Cl.
*G09G 5/00* (2006.01)
*B60K 35/00* (2006.01)
(Continued)

(52) U.S. Cl.
CPC .......... *G02B 27/0101* (2013.01); *B60K 35/00* (2013.01); *H04N 9/3141* (2013.01); *G02B 2027/0118* (2013.01)

(58) Field of Classification Search
CPC ........ G02B 27/0101; G02B 2027/0118; G02B 17/0804; B60K 35/00; B60K 2370/1529;
(Continued)

(56) References Cited

U.S. PATENT DOCUMENTS 10,025,095 B2 * 7/2018 Asai ........................ F21V 5/008
10,871,686 B2 12/2020 Hada et al.
(Continued)

FOREIGN PATENT DOCUMENTS

JP 2016-095411 A 5/2016
JP 2016-126314 A 7/2016
(Continued)

OTHER PUBLICATIONS

International Search Report issued in WIPO Patent Application No. PCT/JP2020/018764, dated Jul. 28, 2020, along with an English translation thereof.

*Primary Examiner* — Thuy N Pardo
(74) *Attorney, Agent, or Firm* — GREENBLUM & BERNSTEIN, P.L.C.

(57) ABSTRACT

A projection device includes: a plurality of light sources arranged in a first direction; a spatial modulation element that modulates incident light into image information and emits the image information; a lens that changes an optical path of light emitted from each of the plurality of light sources such that the light emitted from each light source reaches substantially the same region of an incident surface of the spatial modulation element; and a first reflective optical member that deflects the light emitted from the lens toward the spatial modulation element, the first reflective optical member having a shape that reflects light emitted from the lens so as to be incident on an arbitrary point on the incident surface of the spatial modulation element at a predetermined reference incident angle.

15 Claims, 5 Drawing Sheets

(51) Int. Cl.
*G02B 27/01* (2006.01)
*H04N 9/31* (2006.01)

(58) Field of Classification Search
CPC .......... B60K 2370/23; B60K 2370/332; B60K 2370/336; H04N 9/3141
USPC ................................................ 345/8, 7, 156
See application file for complete search history.

(56) References Cited

U.S. PATENT DOCUMENTS

| | | |
|---|---|---|
| 2004/0227919 A1 | 11/2004 | Shiraishi |
| 2006/0061770 A1 | 3/2006 | Erskine |
| 2008/0094599 A1 | 4/2008 | Scheible |
| 2013/0313418 A9 | 11/2013 | Campion |
| 2014/0307245 A1 | 10/2014 | Tanaka |
| 2015/0077760 A1 | 3/2015 | Koerner |
| 2016/0282617 A1 | 9/2016 | Asai |
| 2016/0299342 A1* | 10/2016 | Asai ................... G02B 19/0066 |
| 2017/0045824 A1* | 2/2017 | Tanaka ............... G02B 26/0833 |
| 2017/0341593 A1 | 11/2017 | Kuntze et al. |
| 2017/0343856 A1 | 11/2017 | Grandclerc et al. |
| 2021/0018750 A1* | 1/2021 | Kuzuhara .............. G02B 13/18 |
| 2021/0055584 A1 | 2/2021 | Hada et al. |

FOREIGN PATENT DOCUMENTS

| | | |
|---|---|---|
| JP | 6078798 B2 | 2/2017 |
| JP | 2018-514796 A | 6/2018 |

\* cited by examiner

PROJECTION DEVICE AND HEAD-UP DISPLAY

CROSS-REFERENCE TO RELATED APPLICATIONS

This is a continuation of U.S. patent application Ser. No. 17/613,261, filed Nov. 22, 2021, which is a National Phase application of International Pat. Appl. No. PCT/JP2020/018764, filed May 11, 2020, which claims the benefit of priority of Japanese Pat. Appl. No. 2019-101313, filed May 30, 2019. The entire disclosure of each of the above-identified documents, including the specification, drawings, and claims, is incorporated herein by reference in its entirety.

TECHNICAL FIELD

The present disclosure relates to a projection device mounted on a vehicle and a head-up display including the projection device.

BACKGROUND ART

In recent years, a head-up display has been developed that displays, for a passenger of a vehicle, an image including information about the vehicle by, for example, a virtual image. Such a head-up display has a problem of reducing luminance unevenness of a virtual image to be displayed.

Under these circumstances, Patent Literature 1 discloses a head-up display in which a plurality of light source elements, a first lens, a second lens, a diffusion member, and a spatial modulation element are arranged in this order, and the first lens changes an optical path of light emitted from each light source element such that the light emitted from each light source element reaches the same region on an incident surface of the spatial modulation element.

In addition, a head-up display mounted on a vehicle is required to be made compact in order to avoid interference with other in-vehicle components. Under these circumstances, Patent Literature 2 discloses a vehicle display device in which a reflector having a predetermined opening angle with a liquid crystal display element is arranged on a back surface side of the liquid crystal display element so as to face the liquid crystal display element, and a light source is arranged in an opening portion having an opening angle with the reflector and the liquid crystal display element.

Meanwhile, in a head-up display mounted on a vehicle, there is an increasing need to increase a size of a virtual image. For this purpose, it is necessary to increase a size of a spatial modulation element. Consequently, it is also necessary to increase a thickness of a lens provided between the spatial modulation element and a light source while ensuring an optical path length between the spatial modulation element and the light source. As a result, in a backlight unit from a back surface of the spatial modulation element to the light source, an amount of protrusion in a normal direction of the spatial modulation element increases, and mountability of the head-up display on a vehicle deteriorates.

In Patent Literature 1, since the plurality of light sources, the first lens, the second lens, the diffusion member, and the spatial modulation element are arranged in series in this order, when the size of the spatial modulation element is increased, the amount of the backlight unit protruding in the normal direction of the spatial modulation element is increased. Therefore, mountability of the head-up display of Patent Literature 1 on a vehicle deteriorates.

In Patent Literature 2, since the reflector is merely arranged to face the liquid crystal display at a predetermined angle, luminance unevenness cannot be suppressed.

CITATION LIST

Patent Literatures

Patent Literature 1: Japanese Patent Application Laid-Open No. 2016-126314
Patent Literature 2: Japanese Patent No. 6078798

SUMMARY OF INVENTION

The present disclosure has been made to solve the above problems, and an object of the present disclosure is to improve mountability on a vehicle while suppressing luminance unevenness of an image emitted by a spatial modulation element.

A projection device according to one aspect of the present disclosure is a projection device mounted on a vehicle, the projection device including: a plurality of light sources arranged in a first direction; a spatial modulation element that modulates incident light into image information and emits the image information; a lens that changes an optical path of light emitted from each of the plurality of light sources such that the light emitted from each light source reaches substantially the same region of an incident surface of the spatial modulation element; and a first reflective optical member that deflects the light emitted from the lens toward the spatial modulation element, the first reflective optical member having a shape that deflects light emitted from the lens so as to be incident on an arbitrary point on the incident surface of the spatial modulation element at a predetermined reference incident angle.

DESCRIPTION OF EMBODIMENTS

Hereinafter, embodiments of the present invention will be described with reference to the accompanying drawings. Note that the following embodiments are examples embodying the present invention and do not limit the technical scope of the present invention.

Figure 1:
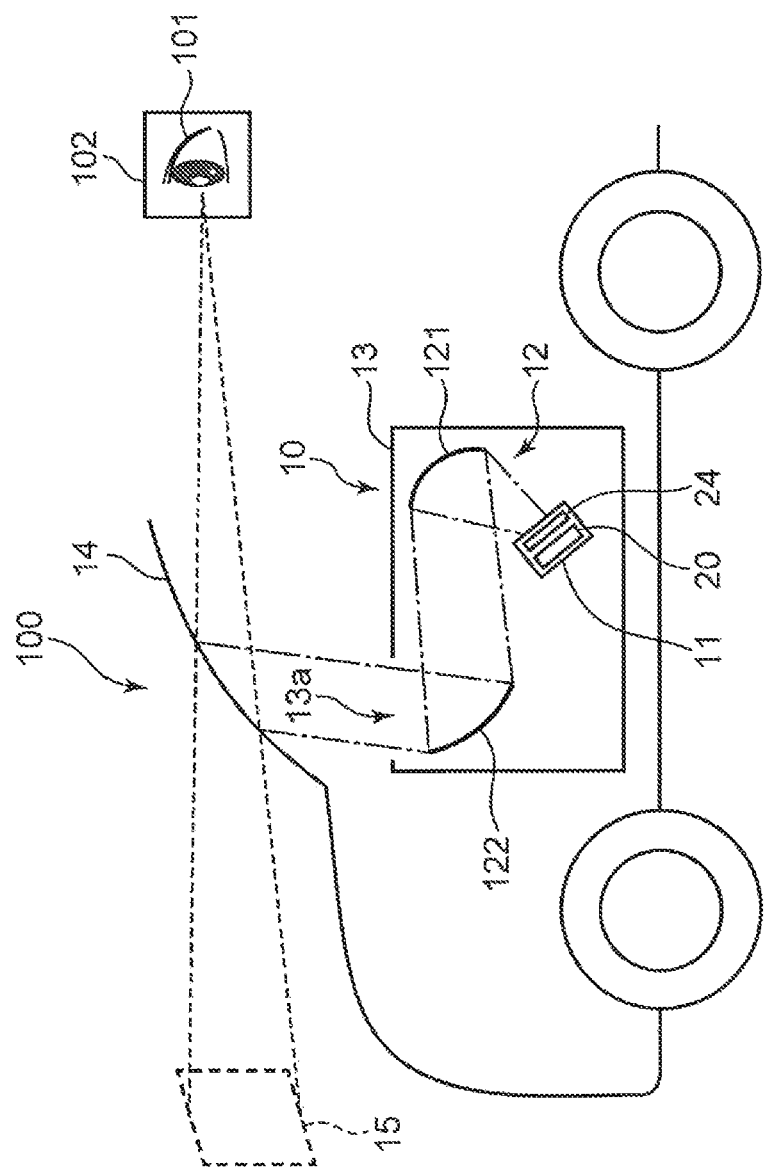
FIG. 1 is a diagram illustrating an example of a configuration of a head-up display according to an embodiment.

Hereinafter, the embodiments will be described with reference to the accompanying drawings. FIG. 1 is a diagram illustrating an example of a configuration of a head-up display 10 according to the embodiment. The head-up display 10 is mounted on a vehicle 100. The vehicle 100 is, for example, a moving body such as a four-wheeled automobile. However, this is an example, and the vehicle 100 may be a railway vehicle, a motorcycle, an aircraft, a helicopter, a ship, and various devices that carry persons.

The vehicle 100 includes a windshield 14. The windshield 14 is, for example, a windshield provided in front of a cockpit of the vehicle 100. The head-up display 10 includes a projection device 11, a reflective optical member 12 (an example of a second reflective optical member), and a casing 13.

The head-up display 10 is a device that projects, onto the windshield 14, an image for allowing an observer 101 to visually recognize a virtual image 15.

The projection device 11 includes a backlight unit 20 and a spatial modulation element 24. The backlight unit 20 illuminates the spatial modulation element 24. The spatial modulation element 24 is, for example, a liquid crystal panel. The spatial modulation element 24 modulates light emitted from the backlight unit 20 according to a video signal input from a display control circuit (not illustrated). The modulated light is emitted from the spatial modulation element 24 as transmitted light.

The spatial modulation element 24 displays an image indicating a state of the vehicle 100, for example, an image indicating a speed meter or an image indicating a speed of the vehicle 100. The transmitted light which has been emitted from the spatial modulation element 24 is guided into an eye box 102 of the observer 101 via the reflective optical member 12 and the windshield 14. Consequently, the observer 101 visually recognizes the virtual image 15. The virtual image 15 displays the state of the vehicle 100 such as speed. Therefore, the observer 101 can check the state of the vehicle 100 through the virtual image 15. The eye box 102 is a region where the observer 101 can visually recognize the virtual image 15 without omission.

The reflective optical member 12 includes a first mirror 121 and a second mirror 122. The first mirror 121 reflects light emitted from the spatial modulation element 24 toward the second mirror 122. The second mirror 122 reflects the light from the first mirror 121 toward the windshield 14. A reflective surface of the second mirror 122 has a concave shape. Although the reflective optical member 12 includes two mirrors of the first mirror 121 and the second mirror 122, this is an example, and the reflective optical member may include one mirror or three or more mirrors. In addition, a refractive optical system such as a lens may be further arranged on an optical path of the reflective optical member 12.

The casing 13 houses the projection device 11 and the reflective optical member 12. The casing 13 is, for example, a substantially rectangular parallelepiped. The casing 13 has, on an upper surface thereof, an opening portion 13a through which light from the reflective optical member 12 is emitted. The opening portion 13a may be provided with a transparent cover.

Figure 2:
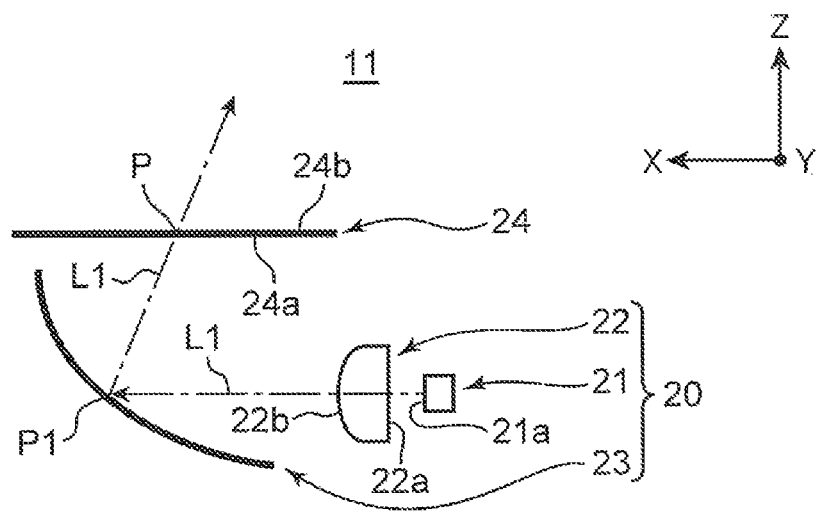
FIG. 2 is a diagram illustrating an example of a configuration of a projection device.
Figure 3:
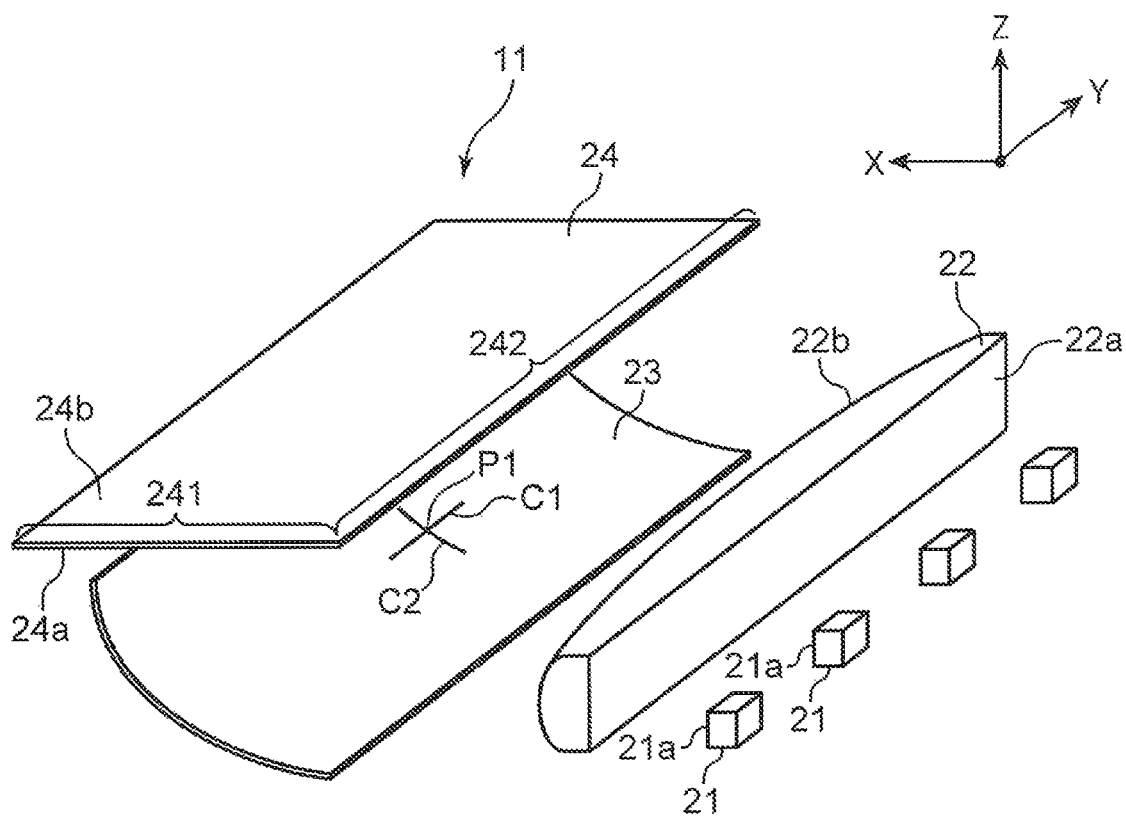
FIG. 3 is a perspective view of the projection device illustrated in FIG. 2.

FIG. 2 is a diagram illustrating an example of a configuration of the projection device 11. The projection device 11 includes a plurality of light sources 21 (see FIG. 3), a lens 22, a reflective optical member 23 (an example of a first reflective optical member), and the spatial modulation element 24. A diffusion member may be further arranged on an incident surface 22a side of the spatial modulation element 24, so that light distribution characteristics of lights from the plurality of light sources 21 can be smoothed. The plurality of light sources 21, the lens 22, and the reflective optical member 23 constitute the backlight unit 20. The spatial modulation element 24 includes an incident surface 24a which light enters and an emission surface 24b from which light is emitted. The incident surface 24a and the emission surface 24b have the same shape. As illustrated in FIG. 3, the incident surface 24a and the emission surface 24b have, for example, a rectangular shape including a short side 241 and a long side 242.

Note that in the following description, a three-dimensional orthogonal coordinate system including three axes of an X axis, a Y axis, and a Z axis orthogonal to each other is set in the drawings. The X axis is parallel to the short side 241 of the spatial modulation element 24. The Y axis is parallel to the long side 242 of the spatial modulation element 24. The Z axis is parallel to a normal line of the spatial modulation element 24. Note that a Y axis direction (a longitudinal direction) is an example of a first direction. A Z axis direction is an example of a second direction orthogonal to the first direction.

FIG. 3 is a perspective view of the projection device 11 illustrated in FIG. 2. As illustrated in FIG. 3, the plurality of light sources 21 are arranged in a line in the Y axis direction, for example, at fixed intervals. However, this is an example, and the light sources may be arranged at unequal intervals. Thus, luminance unevenness can be suppressed. Each of the plurality of light sources 21 includes a light emission surface 21a. The plurality of light sources 21 are arranged such that a normal line of the emission surface 21a is parallel to the X axis. The plurality of light sources 21 are, for example, light emitting diodes (LED). However, this is an example, and the plurality of light sources 21 may be, for example, laser diodes or organic light emitting diodes. Note that although in FIG. 3, four light sources 21 are illustrated as the plurality of light sources 21, this is merely an example, and the number of the plurality of light sources 21 can take any value of two or more.

Furthermore, the plurality of light sources 21 are arranged such that the normal line of the emission surface 21a intersects the normal line of the spatial modulation element 24. In FIG. 2, the normal line of the emission surface 21a faces an X axis direction, and the normal line of the spatial modulation element 24 faces the Z axis direction. Therefore, the normal line of the spatial modulation element 24 and the normal line of the emission surface 21a are orthogonal to each other, this is an example. For example, angles of both the normal lines can be any angle as long as it is an angle other than 180 degrees, and can be, for example, an angle of 10 degrees or more and 90 degrees or less, an angle of 20 degrees or more and 80 degrees or less, and an angle of 30 degrees or more and 70 degrees or less.

The lens 22 changes an optical path of light emitted from each of the plurality of light sources 21 such that the light emitted from each light source 21 reaches substantially the same region of the incident surface 24a of the spatial modulation element 24. Substantially the same region is intended to allow a slight deviation for a region reached by light emitted from each of the plurality of light sources 21. Specifically, the lens 22 is arranged close to the plurality of light sources 21. The lens 22 has a longitudinal direction parallel to the Y axis direction. The lens 22 includes the incident surface 22a which lights emitted from the plurality of light sources 21 enter. The lens 22 includes an emission surface 22b that deflects diverging lights of the plurality of light sources 21 in the Z axis direction into substantially parallel lights and emits the substantially parallel lights. The incident surface 22a faces the emission surfaces 21a of the plurality of light sources 21. One lens 22 is arranged for the plurality of light sources 21. However, this is an example, and two, or three or more lenses may be arranged for the plurality of light sources 21.

At least one of the incident surface 22a and the emission surface 22b of the lens 22 has a convex shape in order to give the lens 22 positive refractive power. The convex shape of at least one of the incident surface 22a and the emission surface 22b of the lens 22 is rotationally symmetric with respect to an optical axis. However, this is an example, and at least one of the incident surface 22a and the emission surface 22b of the lens 22 may have a toroidal shape having different curvatures in the Y axis direction and the Z axis direction or a free-form surface shape. A total internal reflection (TIR) lens can be also used as the incident surface 22a of the lens 22. This enables the light from the light source 21 to be efficiently emitted to the reflective optical member 23, resulting in improving light use efficiency. In the present embodiment, the lens 22 is a plano-convex lens in which only the emission surface 22b has a convex shape.

The emission surface 22b of the lens 22 has a convex shape with an aspherical form in which curvatures in the Y axis direction and the Z axis direction are different from each other. Specifically, the emission surface 22b has a curvature in the Z axis direction larger than a curvature in the Y axis direction. The reason why the curvature in the Z axis direction is made larger than the curvature in the Y axis direction is to narrow down a light beam and guide a parallel light toward the short side 241 of the spatial modulation element 24. On the other hand, the reason why the curvature in the Y axis direction is made smaller than the curvature in the Z axis direction is that the light from each light source 21 is guided over the entire long side 242. Therefore, in the spatial modulation element 24 having the Y axis direction as a longitudinal direction and the X axis direction as a lateral direction, the lens 22 is allowed to constitute a lens suitable for light emitted from each of the plurality of light sources 21 to reach the same region of the incident surface 24a of the spatial modulation element 24.

Furthermore, the emission surface 22b has a shape in the Y axis direction, for example, in which the curvature decreases from the center to the edge so that an illuminance distribution, of the light emitted from the plurality of light sources 21, on the incident surface 24a of the spatial modulation element 24 becomes uniform. However, a free-form surface shape may be provided in order to reduce the luminance unevenness, and the shape is not limited thereto. In addition, the emission surface 22b has a shape in the Z axis direction, for example, in which the curvature decreases from the center to the edge so that the illuminance distribution on the incident surface 24a becomes uniform. However, a free-form surface shape may be provided in order to reduce the luminance unevenness, and the shape is not limited thereto.

The lens 22 is made of a transparent material having a predetermined refractive index. The refractive index of the transparent material is, for example, about 1.4 to 1.6. As the transparent material, a resin such as an epoxy resin, a silicon resin, an acrylic resin, or polycarbonate can be used. In the present embodiment, the lens 22 is made from, for example, polycarbonate in consideration of heat resistance.

Reference is made to FIG. 2. The reflective optical member 23 includes a reflective surface that deflects the light emitted from the lens 22 toward the spatial modulation element 24. The reflective optical member 23 has a shape that deflects light emitted from the lens 22 so as to be incident on an arbitrary position P on the incident surface 24a of the spatial modulation element 24 at a predetermined reference incident angle. Specifically, the reflective optical member 23 has a free-form surface shape. The arbitrary position P represents a plurality of positions on the incident surface 24a. The reflective optical member 23 is, for example, a mirror.

In the head-up display 10, the position, the shape, and the like of the reflective optical member 12 are determined such that the virtual image 15 of a target size is displayed at a target display position, and a reference incident angle at each of the plurality of positions on the incident surface 24a of the spatial modulation element 24 is determined based on the determined position and shape of the reflective optical member 12. Therefore, a shape, of the reflective optical member 23, at a position P1 as a position where a light beam L1 is deflected toward the position P, has a shape that causes the light beam L1 to be incident on the position P at the reference incident angle.

The reference incident angle includes a first component viewed from the long side 242 of the spatial modulation element 24, i.e., from the X axis direction, and a second component viewed from the short side 241, i.e., from the Y axis direction. Therefore, the shape at the position P1 is a shape which causes the light beam L1 to enter the position P with the first component and the second component of the reference incident angle. Accordingly, the reflective optical member 23 has a free-form surface shape in which each position P1 causes the light beam L1 to be incident on the corresponding position P on the incident surface 24a with the first component and the second component of the reference incident angle. As illustrated in FIG. 3, at the position P1, a curvature C1 obtained when the reflective optical member 23 is cut along an X-Y plane is, for example, larger than a curvature C2 obtained when the reflective optical member 23 is cut along a Z-X plane. Accordingly, as a whole, a degree of inclination of the reflective optical member 23 when viewed from the Z axis direction is larger than a degree of inclination when viewed from the Y axis direction.

Although the reflective optical member 12 has been here described as having a free-form surface shape, the present disclosure is not limited thereto. As a result of determining the shape at each position P1 of the reflective optical member 23 such that light enters the position P at the reference incident angle, the reflective optical member 12 may have a flat plate shape or a spherical shape. In this case, the reflective optical member 23 can have a planar shape or a spherical shape.

As described above, according to the present embodiment, the reflective optical member 23 deflects the light beam emitted from the lens 22 and guides the light beam to the spatial modulation element 24. This brings the plurality of light sources 21 to be arranged such that the normal line of the emission surface 21a intersects the normal line of the spatial modulation element 24. As a result, when the size of the spatial modulation element 24 is increased, an amount by which the backlight unit 20 protrudes in the normal direction of the spatial modulation element 24 can be suppressed. As a result, the present embodiment enables improvement of mountability of the head-up display 10 on the vehicle 100.

In addition, the lens 22 changes an optical path of light emitted from each of the plurality of light sources 21 such that the light emitted from each light source reaches the same region of the incident surface 24a of the spatial modulation element 24. Furthermore, the reflective optical member 23 has a shape that deflects light emitted from the lens 22 so as to be incident on an arbitrary point P on the incident surface of the spatial modulation element 24 at a reference incident angle. Therefore, the present embodiment enables luminance unevenness of an image emitted by the spatial modulation element 24 to be suppressed.

Further, as illustrated in FIG. 3, the plurality of light sources 21 are arranged in parallel with the long side 242 of the spatial modulation element 24. Therefore, the size of the projection device 11 can be reduced as a whole as compared with a case where the plurality of light sources 21 are arranged in parallel with the short side 241 of the spatial modulation element 24. This enables further improvement of mountability of the head-up display 10 on the vehicle 100.

Note that the present disclosure is allowed to adopt the following modification.

Figure 4:
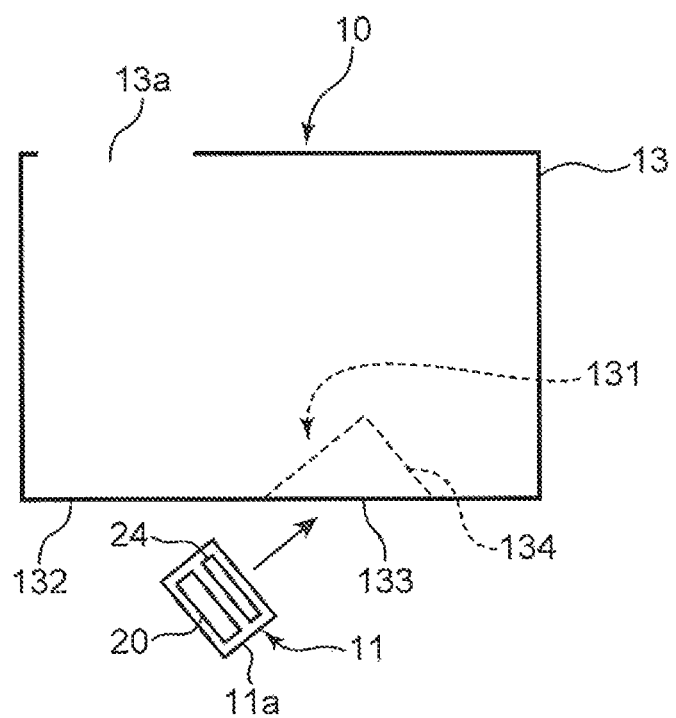
FIG. 4 is a diagram illustrating an example of a casing of a head-up display according to a modification of the present disclosure.

(1) FIG. 4 is a diagram illustrating an example of the casing 13 of the head-up display 10 according to the modification of the present disclosure. In FIG. 4, the casing 13 includes an attachment portion 131 to which the projection device 11 is attached. The attachment portion 131 is a bottomed hole extending obliquely from an opening portion 133 in a bottom surface 132 of the casing 13. A cross section of the attachment portion 131 has the same shape as a cross section of the projection device. Therefore, the projection device 11 is fitted into the attachment portion 131 by insertion into the casing 13 in an arrow direction. A bottom surface 134 of the attachment portion 131 is open. Accordingly, the light emitted from the spatial modulation element 24 is taken into the casing 13 and guided to the windshield 14 via the reflective optical member 12 and an opening portion 13a illustrated in FIG. 1.

(2) Although in the modification (1), the spatial modulation element 24 is provided inside a casing 11a of the projection device 11, this is an example. The spatial modulation element 24 may be provided on the bottom surface 134 of the attachment portion 131.

Figure 5:
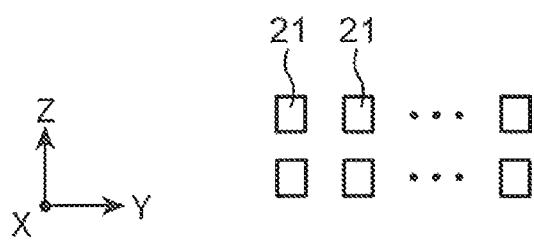
FIG. 5 is a diagram illustrating an example of arrangement of a plurality of light sources according to the modification of the present disclosure.

(3) Although in the example of FIG. 3, the plurality of light sources 21 are arranged in a line in the Y axis direction, this is an example. FIG. 5 is a diagram illustrating an example of arrangement of the plurality of light sources 21 according to the modification of the present disclosure. As illustrated in FIG. 5, the plurality of light sources 21 may be arranged in a matrix of predetermined rows×predetermined columns in the Y axis direction and the Z axis direction. As a result, an image having sufficient luminance can be obtained in a case where the spatial modulation element 24 is enlarged.

(4) Although in the example of FIG. 1, the head-up display 10 displays the virtual image 15, the present disclosure is not limited thereto, and an image may be displayed on a part (for example, a console box or the like) of the vehicle 100.

A projection device according to one aspect of the present disclosure is a projection device mounted on a vehicle, the projection device including: a plurality of light sources arranged in a first direction; a spatial modulation element that modulates incident light into image information and emits the image information; a lens that changes an optical path of light emitted from each of the plurality of light sources such that the light emitted from each light source reaches substantially the same region of an incident surface of the spatial modulation element; and a first reflective optical member that deflects the light emitted from the lens toward the spatial modulation element, the first reflective optical member having a shape that deflects light emitted from the lens so as to be incident on an arbitrary point on the incident surface of the spatial modulation element at a predetermined reference incident angle.

According to this configuration, the first reflective optical member deflects light emitted from the lens and guides the light to the spatial modulation element. Accordingly, this configuration allows the plurality of light sources to be arranged such that a normal line of an emission surface intersects a normal line of the spatial modulation element. As a result, when the size of the spatial modulation element is increased, this configuration enables suppression of an amount by which a backlight unit from the light source to the spatial modulation element protrudes in the normal direction of the spatial modulation element. As a result, this configuration enables improvement of mountability of the head-up display on a vehicle.

In addition, the lens changes the optical path of the light emitted from each of the plurality of light sources such that the light emitted from each light source reaches the same region of the incident surface of the spatial modulation element. Furthermore, the first reflective optical member has a shape that deflects light emitted from the lens so as to be incident on an arbitrary point on the incident surface of the spatial modulation element at the reference incident angle. Therefore, this configuration enables luminance unevenness of an image emitted by the spatial modulation element to be suppressed.

In the above aspect, the first reflective optical member may have a free-form surface shape.

According to this configuration, since the first reflective optical member has the free-form surface shape, it is possible to easily make light emitted from the lens be incident on an arbitrary point on the incident surface of the spatial modulation element at the reference incident angle.

In the above aspect, the plurality of light sources may be arranged such that a normal line of an emission surface intersects a normal line of the spatial modulation element.

According to this configuration, since the plurality of light sources are arranged such that the normal line of the emission surface intersects the normal line of the spatial modulation element, an amount by which a backlight unit from the light source to the spatial modulation element protrudes in the normal direction of the spatial modulation element can be more reliably suppressed. As a result, this configuration enables further improvement of mountability of the head-up display on a vehicle.

In the above aspect, the first direction may be parallel to a longitudinal direction of the spatial modulation element.

According to this configuration, since the plurality of light sources are arranged in parallel to the longitudinal direction of the spatial modulation element, the projection device can be downsized as compared with a case where the plurality of light sources are arranged in parallel to a lateral direction of the spatial modulation element.

In the above aspect, the lens may have a convex surface at least as the emission surface.

According to this configuration, it is possible to easily realize a lens that changes an optical path of light emitted from each of the plurality of light sources such that the light emitted from each light source reaches the same region of the incident surface of the spatial modulation element.

In the above aspect, the emission surface of the lens may have a larger curvature in a second direction than a curvature in the first direction, the second direction being orthogonal to the first direction.

According to this configuration, since in the spatial modulation element having the first direction as a longitudinal direction and the second direction as a lateral direction, a lens can be configured which is suitable for light emitted from each of the plurality of light sources to reach the same region of the incident surface of the spatial modulation element.

In the above aspect, the plurality of light sources may be arranged in a matrix in the first direction and the second direction orthogonal to the first direction.

According to this configuration, an image having sufficient luminance can be obtained in a case where the spatial modulation element is enlarged.

A head-up display according to another aspect of the present disclosure includes the above-described projection device; and a second reflective optical member for projecting light emitted from the spatial modulation element onto a reflective member provided on the vehicle.

According to the present configuration, it is possible to provide a head-up display having improved mountability on a vehicle while suppressing luminance unevenness of an image emitted from the spatial modulation element.

INDUSTRIAL APPLICABILITY

The present disclosure is applicable to a device that is mounted on a vehicle and displays video such as a virtual image.

What is claimed is:

1. A projection device mounted on a vehicle, comprising:
   a plurality of light sources arranged in a first direction;
   a display element in which light from the light source incident and emits image information;
   a lens that guides the optical path of light emitted from each of a plurality of light sources in the direction of the incident plane of the display element; and
   a first reflective optical member that deflects the light emitted from the lens toward the display element,
   wherein the first reflective optical member has a shape that deflects light emitted from the lens so as to be incident on an arbitrary point on the incident surface of the display element at a predetermined reference incident angle.

2. The projection device according to claim 1, wherein the first reflective optical member has a free-form surface shape.

3. The projection device according to claim 2, wherein a first curvature in a first direction at a first point of the first reflective optical member is different than a second curvature in a second direction different from the first direction at the first point of the first reflective optical member.

4. The projection device according to claim 1, wherein the first reflective optical member reflects the light emitted from a plurality of light sources.

5. The projection device according to claim 1, wherein the plurality of light sources are arranged such that a normal line of an emission surface intersects a normal line of the display element.

6. The projection device according to claim 5, wherein an angle of the normal line of the emission surface and the normal line of the display element is not less than 10 degrees nor more than 90 degrees.

7. The projection device according to claim 5, wherein the first direction is parallel to a longitudinal direction of the display element.

8. The projection device according to claim 1, wherein the lens has a convex surface at least as the emission surface.

9. The projection device according to claim 8, wherein the emission surface of the lens has a larger curvature in a second direction than a curvature in the first direction, the second direction being orthogonal to the first direction.

10. The projection device according to claim 1, wherein the plurality of light sources are arranged in a matrix in the first direction and the second direction orthogonal to the first direction.

11. The projection device according to claim 1, wherein the lens changes the optical path of light emitted from each of the plurality of light sources such that the light emitted from each light source reaches substantially the same region of an incident surface of the display element.

12. The projection device according to claim 1, wherein the lens is composed of a plurality of lenses.

13. The projection device according to claim 1, wherein the lens is made from resin.

14. A head-up display comprising:
    the projection device according to claim 1; and
    a second reflective optical member for projecting light emitted from the display element onto a reflective member provided on the vehicle.

15. The head-up display according to claim 14 further comprising:
    a casing that accommodates the projection device and the second reflective optical member and has an opening portion for emitting projecting light reflected by the second mirror,
    wherein a normal line of the opening portion and a third direction in which the light source emits light intersect.

* * * * *